United States Patent [19]
Maas

[11] Patent Number: 5,356,210
[45] Date of Patent: Oct. 18, 1994

[54] ANTI-LOCK HYDRAULIC BRAKE SYSTEM

[75] Inventor: Joachim Maas, Bad Vilbel, Fed. Rep. of Germany

[73] Assignee: Alfred Teves GmbH, Fed. Rep. of Germany

[21] Appl. No.: 184,747

[22] Filed: Jan. 21, 1994

Related U.S. Application Data

[63] Continuation of Ser. No. 946,462, Nov. 13, 1992, abandoned.

[30] Foreign Application Priority Data

Mar. 16, 1991 [DE] Fed. Rep. of Germany ....... 4108640

[51] Int. Cl.⁵ .............................................. B60T 8/42
[52] U.S. Cl. ................................... 303/116.1; 303/68; 303/72; 303/119.1; 303/900; 303/115.1
[58] Field of Search .............. 303/119.1, 119.2, 116.1, 303/116.2, 115.1, 115.3, 115.4, 115.5, 115.6, 113.2, 113.3, 113.1, 10, 68, 69, 72, 87, 110, 900, 901, 117.1, 118.1, 116.4, 116.3; 188/181 A

[56] References Cited

U.S. PATENT DOCUMENTS

| | | |
|---|---|---|
| 3,667,816 | 6/1972 | Harned . |
| 3,717,385 | 2/1973 | Michellone et al. ............ 303/900 X |
| 3,753,598 | 8/1973 | Michellone et al. ............. 303/113.2 |
| 3,756,664 | 9/1973 | Schlitz et al. ....................... 303/900 |
| 3,761,141 | 9/1973 | Baurle et al. ..................... 303/113.1 |
| 3,836,208 | 9/1974 | Wienecke ......................... 303/115.4 |
| 3,858,946 | 1/1975 | Grosseau ............................. 303/68 |
| 3,866,983 | 2/1975 | Kondo ................................ 303/900 |
| 3,975,061 | 8/1976 | Kondo et al. ................... 303/900 X |
| 4,099,793 | 7/1978 | Iio ................................. 303/68 X |
| 4,556,260 | 12/1985 | Maehara . |
| 4,618,189 | 10/1986 | Nakanishi et al. .............. 303/115.4 |
| 4,685,747 | 8/1987 | Belart et al. ................. 303/116.1 X |
| 4,708,407 | 11/1987 | Maehara ............................... 303/68 |
| 4,730,877 | 3/1988 | Seibert et al. . |
| 4,765,692 | 8/1988 | Miyake . |
| 4,840,435 | 6/1989 | Steffes . |
| 4,844,558 | 7/1989 | Ishii et al. . |
| 4,846,535 | 7/1989 | Kuwana et al. . |
| 4,940,294 | 7/1990 | Foster . |
| 4,952,002 | 8/1990 | Arikawa et al. ................ 303/116.1 |
| 5,007,687 | 4/1991 | Kircher et al. ................... 303/113.1 |
| 5,026,123 | 6/1991 | Nokubo et al. ................... 303/117.1 |
| 5,033,800 | 7/1991 | Willmann .......................... 303/116.1 |
| 5,039,176 | 8/1991 | Hellmann et al. ................ 303/68 X |
| 5,046,788 | 9/1991 | Lindenman ....................... 303/116.1 |
| 5,058,961 | 10/1991 | Mergenthaler et al. ......... 303/115.4 |
| 5,094,512 | 3/1992 | Kohno et al. .................... 303/117.1 |
| 5,096,269 | 3/1992 | Pickenhahn ...................... 303/115.4 |
| 5,152,586 | 10/1992 | Burgdorf .......................... 303/113.2 |
| 5,152,589 | 10/1992 | Ocvirk ................................. 303/900 |
| 5,174,636 | 12/1992 | Burgdorf .......................... 303/113.2 |
| 5,188,433 | 2/1993 | Reinartz et al. ..................... 303/900 |
| 5,192,120 | 3/1993 | Reinartz et al. ..................... 303/10 |
| 5,195,810 | 3/1993 | Ocvirk et al. .................... 303/116.2 |
| 5,213,399 | 5/1993 | Burgdorf et al. ............ 303/119.1 X |

FOREIGN PATENT DOCUMENTS

| | | |
|---|---|---|
| 3542689 | 6/1987 | Fed. Rep. of Germany . |
| 3638866 | 7/1987 | Fed. Rep. of Germany . |
| 3731295 | 4/1988 | Fed. Rep. of Germany . |
| 3721210 | 1/1989 | Fed. Rep. of Germany . |
| 4002635 | 8/1991 | Fed. Rep. of Germany ...... 303/900 |
| 63-78857 | 4/1988 | Japan ............................... 303/116.1 |
| 61225016 | 8/1988 | Japan . |
| 63-162358 | 11/1988 | Japan . |
| 62278597 | 8/1989 | Japan . |
| 62319691 | 9/1989 | Japan . |
| 2056606 | 3/1981 | United Kingdom . |
| 2195724 | 4/1988 | United Kingdom . |

Primary Examiner—Douglas C. Butler
Attorney, Agent, or Firm—Robert P. Seitter; J. Gordon Lewis

[57] ABSTRACT

An anti-lock hydraulic brake system provides a phase of pressure increase, a phase of pressure decrease as well as a phase in which the pressure is kept constant. To this end, an outlet valve and a selector valve are provided. The selector valve is not connected to the pressure side of the pump as is usual but to the suction side of the pump. This arrangement produces the advantage that the selector valve is disposed in the low-pressure area of the brake system thereby eliminating the occurrence of great pressure surges which result in the emission of noise.

1 Claim, 1 Drawing Sheet

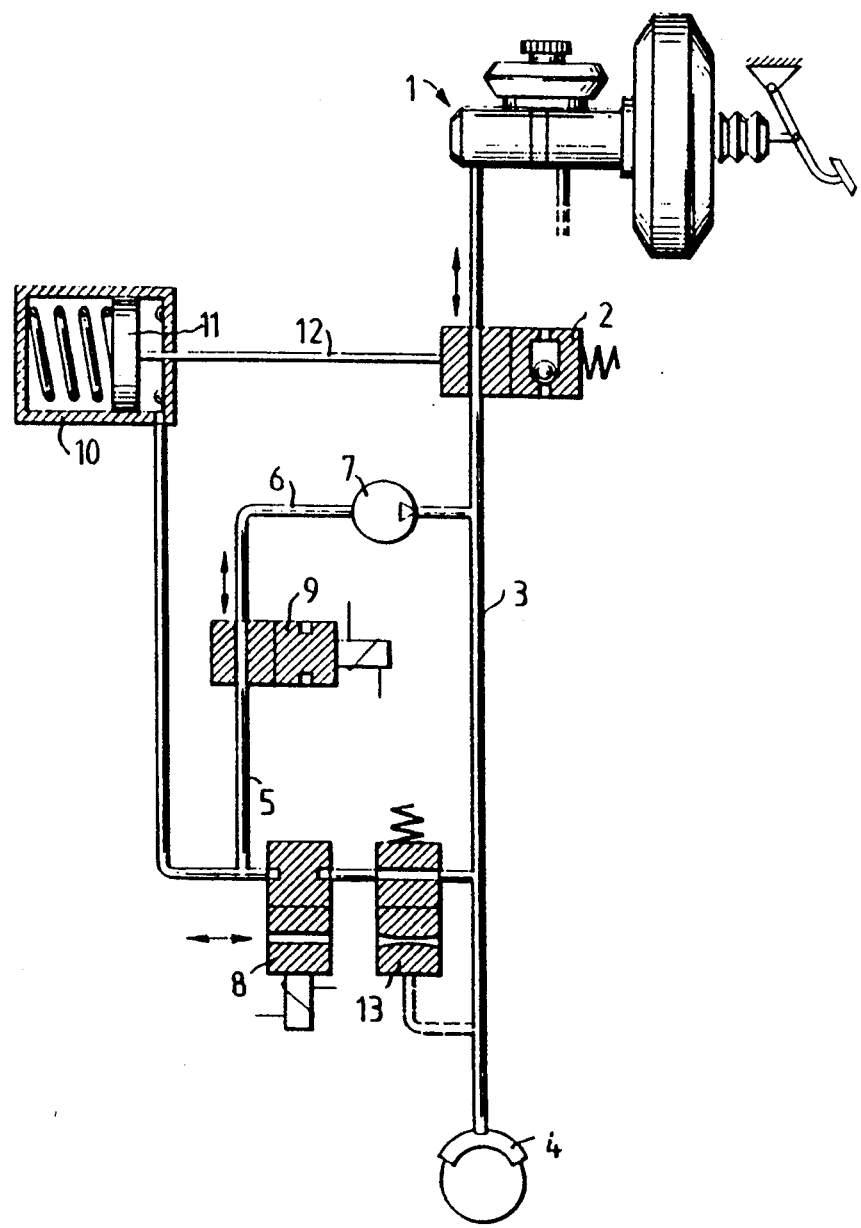

ANTI-LOCK HYDRAULIC BRAKE SYSTEM

This is a continuation of copending application(s) Ser. No. 07/946/462 filed on Nov. 13, 1992 now abandoned.

BACKGROUND OF THE INVENTION

The present invention relates to an anti-lock hydraulic brake system and more particularly to an anti-lock hydraulic brake system which reduces noise resulting from pressure surges utilizing a pressure fluid collecting means and a selector valve connected to the suction side of the pump. This system includes a master cylinder and at least one wheel brake connected via a brake line to the master cylinder, a cut-off valve to close the master cylinder in relation to the pressure fluid circuit, a pressure-fluid collecting means connecting to the wheel brake, an outlet valve in the connection between wheel brake and pressure-fluid collecting means, and a pump communicating with its suction side to the pressure-fluid collecting means.

An anti-lock hydraulic brake system is known from GB 2 056 606 A disclosing a system in which the outlet valve is opened to decrease the pressure in the wheel brake so that pressure fluid can discharge into the pressure-fluid collecting means. The pressure-fluid collecting means is a low-pressure accumulator, the piston of which simultaneously functions as a valve member for the cut-off valve. As a result, the cut-off valve closes automatically when the low-pressure accumulator is charged. The pump delivers fluid from the low-pressure accumulator directly into the wheel brake. In other words, pressure control is effected by one valve only. Although this affords ease of actuation, control functions are limited at the same time. More particularly, no pressure-retaining phase can be realized.

Admittedly, it is known to provide another valve, a so-called inlet valve, in the connection between the pump and the wheel brake to disconnect the wheel brake from pressure-fluid delivery. However, it has been shown that a great deal of switching noise results from the operation of this inlet valve. The price for the enhanced ease of actuation is the augmentation of noise emission from the system.

SUMMARY OF THE INVENTION

It is, therefore, the object of the present invention to provide an anti-lock hydraulic brake system affording low-noise operation and great ease of actuation. In particular, realization of a pressure-retaining phase is sought to be achieved.

This object is achieved by interposing a valve in the connection between the pressure-fluid collecting means and the pump. This valve performs the function of the inlet valve which is usually arranged between the pump and the wheel brake. This arrangement permits great ease of actuation to be achieved. Since the valve is not disposed in the high-pressure area of the system, little switching noise occurs.

A low-pressure accumulator is particularly suited as a pressure-fluid collecting means, however, it would also be expedient to use a pressure fluid supply reservoir which is open towards the atmosphere and is arranged in an open control circuit.

In conjunction with the outlet valve, a switchable throttle valve can be utilized to provide an additional restriction in the connection between the wheel brake and the pressure-fluid collecting means upon the attainment of a defined pressure in the wheel brake.

The concept underlying the present invention shall be explained in more detail hereinbelow through a description of the preferred embodiment illustrated in FIG. 1 using only one wheel brake. When this system is used on a four-wheel vehicle, the illustrated system is used on each wheel brake or wheel brake group to be controlled.

BRIEF DESCRIPTION OF THE DRAWINGS

The single FIGURE is a schematic view of one wheel brake system.

DETAILED DESCRIPTION OF THE PREFERRED EMBODIMENT

The brake system is composed of a master cylinder 1 to which a wheel brake 4 is connected via a brake line 3. Inserted into the brake line 3, is a cut-off valve 2 having two switch positions. Free pressure-fluid passage is provided in the initial position, while a non-return valve opening towards the master brake cylinder becomes operative in the switched position.

The wheel brake 4 communicates via a return line 5 with a low-pressure accumulator 10. Inserted into the return line 5 is an outlet valve 8 which is operated electromagnetically and closes the return line 5 in its initial position. The return line 5 is opened in the switched position of outlet valve 8.

The low-pressure accumulator 10 comprises a spring-loaded piston 11 which is coupled to the cut-off valve 2 via a mechanical device 12. The cut-off valve 2 is retained in its initial position as long as the low-pressure accumulator 10 is not filled. Once the outlet valve 8 is opened and the low-pressure accumulator 10 is filled, the cut-off valve 2 will be actuated causing it to assume its switched position.

Connected to the low-pressure accumulator 10 via a suction line 6 is a pump 7 which, on its pressure side, communicates with the brake line 3 between the wheel brake 4 and the cut-off valve 2. Disposed in the suction line 6, is a selector valve 9 which is operated electromagnetically and keeps the suction line open when in its initial position. Suction line 6 is closed in its switched position.

In addition, a throttle valve 13 can be provided in the return line 5. This valve is operated by the pressure in the wheel brake 4. As soon as a defined pressure is attained in the wheel brake 4, throttle valve 13 will switch from an open position to a throttle position.

The brake system operates as follows:

Operation of the master cylinder 1 causes pressure to develop in the brake circuit which results in operation of the wheel brake 4. Following as a result is wheel deceleration and, consequently, vehicle deceleration. The rotational behavior of the wheel is constantly sensed by means of a non-illustrated sensor, the signals of which are recorded by an electronic analyzing unit, also not shown. Once the electronic analyzing unit determines that a locked condition of the wheel is imminent, the anti-lock mode will commence. This mode implies that the pump 7 will be switched on and will open the outlet valve 8 in a first step. Consequently, pressure fluid flows out of the wheel brake 4 into the low-pressure accumulator 10, causing the cut-off valve 2 to close, as explained above. Pressure reduction follows as a result. At the same time, the selector valve 9 is switched to assume its closed position so that the pump 7 which, preferably, is a non-self-priming pump is not allowed to supply fluid out of the low-pressure accumulator 10. To restore pressure, the selector valve 9 is opened so that the pump 7 is primed with pressure fluid which it returns to the wheel brake 4. When outlet valve 8 and selector valve 9 are closed, the pressure is retained in the wheel brake 4. Hence, a pressure-increase phase and a pressure-decrease phase as well as a pressure-retaining phase can be realized. There is great ease of actuation. Since the selector valve 9 which performs the function of an inlet valve is arranged on the suction side of the pump 7, no great pressure surges will occur upon closing the selector valve 9 with the result that little noise develops.

The throttle valve 13 brings about an even pressure reduction per time unit largely irrespective of the magnitude of the wheel braking pressure.

I claim:

1. An anti-lock hydraulic brake system with a master cylinder comprising:
   at least one wheel brake;
   a brake line connecting said master cylinder to said wheel brake and a cut-off valve to close said master cylinder in relation to said brake system;
   pressure-fluid collecting means, connected to said wheel brake by way of an outlet valve switchable between an open position and a closed position, for collecting pressure fluid from said wheel brake;
   a pump, having a suction side and a pressure side, said pump communicating with its suction side to said pressure-fluid collecting means by way of a selector valve and with its pressure side directly to said wheel brake, wherein said pressure-fluid collecting means is a low-pressure accumulator, and wherein said cut-off valve is coupled mechanically to the piston of the low-pressure accumulator; and
   throttle means located between the brake and the outlet valve in a line of the brake system separate from the brake line for providing an additional restriction in the connection between the wheel brake and the pressure-fluid collecting means upon the attainment of a defined pressure in the wheel brake, the throttle means operated between an open position and a throttle position by the change in pressure in the wheel brake to ensure an even pressure reduction per unit of time independently of a given magnitude of wheel braking pressure.

* * * * *